United States Patent [19]

Tamiya

[11] Patent Number: 5,637,868
[45] Date of Patent: Jun. 10, 1997

[54] FIXED POINT DETECTING DEVICE USING DETECTION OF LIGHT DIFFRACTED BY HOLOGRAPHIC DIFFRACTION GRATINGS

[75] Inventor: Hideaki Tamiya, Tokyo, Japan

[73] Assignee: Sony Magnescale Inc., Tokyo, Japan

[21] Appl. No.: 412,951

[22] Filed: Mar. 29, 1995

[30] Foreign Application Priority Data

Mar. 31, 1994 [JP] Japan ................................. 6-063901

[51] Int. Cl.$^6$ ........................................... G02B 27/44
[52] U.S. Cl. ................... 250/237 G; 250/231.16; 356/356; 359/566
[58] Field of Search .................. 250/231.13, 231.14, 250/231.16, 237 G; 356/356, 355, 354, 358, 357, 400, 399, 363; 359/15, 17, 18, 566, 569, 572, 573

[56] References Cited

U.S. PATENT DOCUMENTS

| | | | |
|---|---|---|---|
| 4,970,388 | 11/1990 | Nishimura et al. | 250/237 G |
| 5,120,132 | 6/1992 | Spies et al. | 356/356 |
| 5,258,861 | 11/1993 | Tsuchiya | 359/15 |
| 5,430,561 | 7/1995 | Kato et al. | 359/566 X |
| 5,483,377 | 1/1996 | Kaneda et al. | 359/566 |
| 5,498,870 | 3/1996 | Ishizuka | 250/237 G |

FOREIGN PATENT DOCUMENTS 61-153501   7/1986   Japan.
4-324316   11/1992   Japan.

*Primary Examiner*—Edward P. Westin
*Assistant Examiner*—John R. Lee
*Attorney, Agent, or Firm*—Foley & Lardner

[57] ABSTRACT

A fixed point detecting device comprises a light source, a hologram disposed therebelow and having two portions, and two light receivers for detecting lights diffracted by the two portions of the hologram, wherein an angle of diffraction of light diffracted by one of the two portions of the hologram and an angle of diffraction of light diffracted by another of the two portions of the hologram have opposite signs and the same absolute value and are constant along the axis of measurement, and a difference in luminous intensity is great between positive and negative homogeneous lights diffracted by the two portions of the hologram.

14 Claims, 13 Drawing Sheets

FIXED POINT DETECTING DEVICE USING DETECTION OF LIGHT DIFFRACTED BY HOLOGRAPHIC DIFFRACTION GRATINGS

BACKGROUND OF THE INVENTION

The present invention relates to a fixed point detecting device and more particularly, to a fixed point detecting device using detection of light diffracted by holographic diffraction gratings, which is suitable for detection of a dislocation of a substrate upon multiple exposure of an integrated circuit, and detection of the origin of an encoder, etc.

As for an X-ray exposure drawing device for manufacturing integrated circuits and a length measuring device to be used for accurate machining, a reference point or an origin is established to measure an exact position or distance. A fixed point detecting device is used for establishing such reference point or origin.

One conventional fixed point detecting device is disclosed in JP-A 61-158501. This device is constructed to detect a fixed point through a mark, and includes a laser generator, a position sensor, etc. A laser beam out of the laser generator is diffracted by diffraction gratings of the mark, and first-order diffracted light is detected by the position sensor. The position sensor serves to determine an angle of diffraction at which the intensity of diffracted light is maximum. A value of the angle of diffraction at which the intensity of diffracted light is maximum is varied when a laser beam spot passes across a boundary of two portions of the mark, i.e. before and behind the boundary of the two portions of the mark. The fixed point is detected by such variation in the angle of diffraction.

Another conventional fixed point detecting device is a variant of the above device. This variant uses two transmission and volume-type holographic diffraction gratings or holograms and two photo detectors. As for the transmission and volume-type holographic diffraction gratings, diffracted lights goes out on the side opposite to incident light with respect to the holographic diffraction gratings. Therefore, the photo detectors are disposed on the side opposite to the laser generator with respect to the holographic diffraction gratings. The holographic diffraction gratings have grating intervals or grating pitches different from each other. Zero-order diffracted lights, positive first-order diffracted lights, negative first-order diffracted lights, and high-order diffracted lights are obtained by the diffraction gratings. Among them, the photo detectors detect positive first-order diffracted light.

Another conventional fixed point detecting device is disclosed in JP-A 4-324318. This device includes a stationary portion and a movable portion which is movable in the direction of measurement, the stationary portion having an optical system and a detecting system, and the movable portion having a substrate and two volume-type holographic diffraction gratings or holograms disposed thereon. The two holograms are disposed on the substrate on an upper side thereof to be adjacent to each other. The two holograms are constructed symmetrically with respect to a center plane. That is, angles of inclination of distributed planes of the holograms are symmetrically and continuously varied on both sides of the center plane, and grating intervals or grating pitch thereof are symmetrically and continuously varied on both sides of the center plane. The two holograms are disposed so that points at which the diffraction efficiencies become maximum are different from each other in the direction of measurement.

When the movable portion is moved relative to the stationary portion, i.e., with respect to light receivers and a light source which are stationary, light diffracted by the first hologram is detected by the first light receiver, whereas light diffracted by the second hologram is detected by the second light receiver. As for the two holograms, the points at which the diffraction efficiencies become maximum are different from each other, so that a peak position of a luminous intensity curve of diffracted light detected by the first light receiver is different from a peak position of a luminous intensity curve of diffracted light detected by the second light receiver. That is, there exists a point at which the two luminous intensities are equal to each other. Such a point is a fixed point obtained by this fixed point detecting device.

However, the above conventional fixed point detecting devices have the following drawbacks.

As for the first prior art reference, the position sensor serves as a light receiving device. The position sensor is constructed to detect an angle of diffraction at which the intensity of diffracted light is maximum, resulting in low resolving power. Moreover, a position sensor is expensive which allows accurate detection of the angle of diffraction.

As for the second prior art reference, the two holographic diffraction gratings have grating intervals or grating pitches different from each other, and the positive first-order diffracted light and the negative first-order diffracted light go out on both sides with respect to the direction of incident lights. Therefore, in order to detect the two positive first-order diffracted light, the two photo detectors should be disposed adjacently. Moreover, the two positive first-order diffracted light should be separated completely for detection through the photo detectors. This can be obtained by simply enlarging a difference between the grating interval of the first hologram and the grating interval of the second hologram. However, when enlarging a difference between the grating intervals of the two holograms, an error is increased with a variation in a wavelength of light out of the light source.

As for the third prior art reference, since the two holograms are constructed symmetrically with respect to the center plane, the fixed point is not changed even with a variation in the wavelength of light out of the light source. However, the two light receivers should be disposed accurately with respect to the two holograms. If not, the resolving power is lowered.

It is, therefore, an object of the present invention to provide a fixed point detecting device which enables accurate determination of a fixed point.

SUMMARY OF THE INVENTION

According to one aspect of the present invention, there is provided a system for detecting a fixed point, the system having an axis of measurement, comprising:

a light source;

a hologram disposed below the light source for diffracting lights out of the light source, the hologram having two portions adjacent to each other and separated by an imaginary center plane perpendicular thereto, the hologram disposed on a transparent substrate; and at least two light receivers arranged to detect light diffracted by the two portions of the hologram, the light including positive and negative same-order light, the fixed point being obtained by determining a point at which light detected by the two light receivers have the magnitude when moving the hologram relative to the light source and the two light receivers along the axis of measurement, wherein an angle of diffraction of light diffracted by one of the two portions of the hologram and an angle of diffraction of light diffracted by another of the two portions of the hologram have opposite signs and the same absolute value, and are constant along the axis of measurement, wherein a difference in luminous intensity is great between the positive and negative homogeneous light.

Another aspect of the present invention lies in providing a system for detecting a fixed point, the system having an axis of measurement, comprising: means for providing light;

means for diffracting light provided by the providing means, the providing means having two portions adjacent to each other and separated by an imaginary center plane perpendicular thereto, the diffracting means disposed on a transparent substrate; and means for detecting lights diffracted by the two portions of the diffracting means, the detecting means having at least two portions, the light including positive and negative same-order lights, the fixed point being obtained by determining a point at which light detected by the two portions of the detecting means have the same magnitude when moving the diffracting means relative to the providing means and the detecting means along the axis of measurement, wherein an angle of diffraction of light diffracted by one of the two portions of the diffracting means and an angle of diffraction of light diffracted by another of the two portions of the diffracting means have opposite signs and the same absolute value and are constant along the axis of measurement, wherein a difference in luminous intensity is great between the positive and negative homogeneous light.

Still another aspect of the present invention lies in providing a system for detecting a fixed point, the system having an axis of measurement, comprising:

two plates symmetrically disposed on both sides of the fixed point, each plate including a pair of holograms disposed on a transparent substrate and adjacent to each other;

two detectors arranged corresponding to the two plates, each detector including a light source and a pair of light receivers arranged to detect lights diffracted by the pair of holograms, the fixed point being determined by light detected by the pairs of light receivers of the two detectors when moving the two plates relative to the two detectors along the axis of measurement; and electric circuit means connected to the two detectors for obtaining a difference in luminous intensity between the two plates.

Still another aspect of the present invention lies in providing a hologram, comprising:

a transparent substrate; and two portions formed on the transparent substrate, the two portions being arranged symmetrically and having grating vectors symmetrically inclined and the same grating interval.

Further aspect of the present invention lies in providing a method of forming a hologram having two portions separated by an- imaginary center plane perpendicular thereto, comprising the steps of:

preparing a transparent substrate having a photosensitizer placed thereon and a mask having a wedge-shaped section with a pointed end;

disposing the mask above the transparent substrate on the imaginary center plane so that said pointed end faces said transparent substrate; and irradiating plane waves from both sides of the imaginary center plane to the transparent substrate at two different angles of incidence.

DETAILED DESCRIPTION OF THE INVENTION

Figure 1:
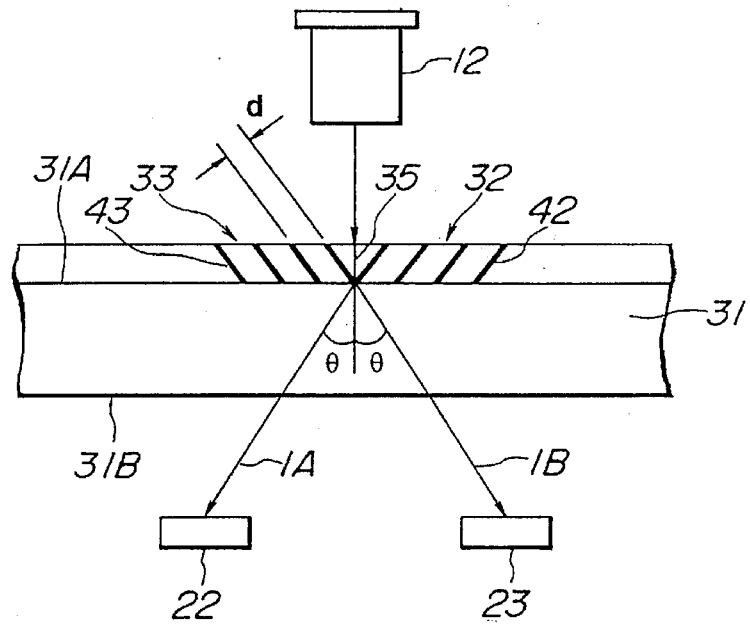
FIG. 1 is a diagrammatic view showing a first embodiment of a fixed point detecting device according to the present invention.

Referring to the drawings wherein like reference numerals designate like parts throughout the views, a description will be made with regard to preferred embodiments of a fixed point detecting device according to the present invention.

Figure 2:
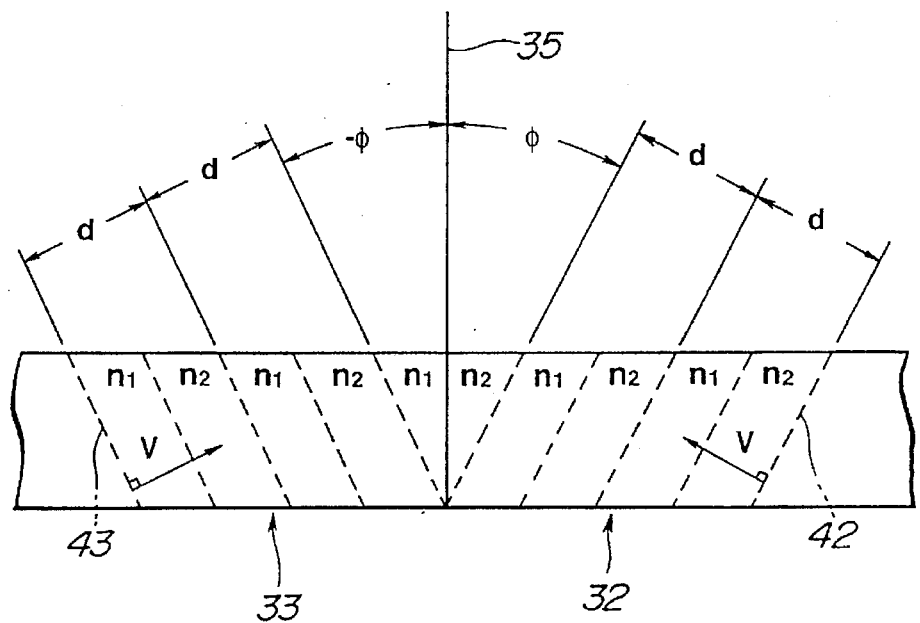
FIG. 2 is a view similar to FIG. 1, showing volume-type holograms.

FIGS. 1 and 2 show a first embodiment of the present invention. Referring to FIG. 1, a fixed point detecting device includes a transparent substrate 31 and two holographic diffraction gratings 32, 33 formed on an upper side 31A thereof. Disposed above the substrate 31 is a light source 12, and disposed therebelow is a pair of light receivers 22, 23 for receiving diffracted lights.

The substrate 31 and the holographic diffraction gratings 32, 33 constitute a movable portion, whereas the light source 12 and the light receivers 22, 23 constitute a stationary portion. It is noted that a condenser lens and an electric processing circuit are not shown.

Referring to FIG. 2, the holographic diffraction gratings 32, 33 are formed by volume-type holograms. As for such holograms, a refractive index is changed from "$n_1$" to "$n_2$" at a predetermined pitch "d" Diffraction gratings are formed with such a change in the refractive index. Referring to FIG. 1, thick lines 42, 43 indicate distributed planes of the refractive index of the volume-type holograms. An interval of each plane 42, 43 is referred to as a grating interval or grating pitch "d".

Grating vectors V are perpendicular to the distributed planes 42, 43. Hereafter, the holographic diffraction gratings are referred to as holograms whenever need arises. Assume between the two holograms 32, 33 a center plane 35 which is perpendicular to upper sides of the holograms 32, 33. Suppose that the angle of inclination of the distributed planes 42, 43 with respect to the center plane 35 is $\phi$. The angles of inclination of the grating vectors V with respect to the distributed planes 42, 43 are 90°−$\phi$.

As shown in FIGS. 1 and 2, the two holograms 32, 33 are constructed symmetrically with respect to the center plane 35. The two holograms 32, 33 have the grating vectors V symmetrically inclined at the same angle of inclination with respect to the center plane 35. Moreover, the two holograms 32, 33 have the same grating interval or grating pitch "d".

Diffracted light beam obtained by the two holograms 32, 33 have the following features:

1) When incident lights beams fall incident on the holograms 32, 33 perpendicularly with respect to the upper sides thereof, i.e., in parallel with respect to the center plane 35, the angles of diffraction of two positive first-order diffracted light bearing 1A, 1B, i.e. angles $\theta$ of diffracted light beams formed with the center plane 35, have opposite signs and the same absolute value. That is, the two positive first-order diffracted lights 1A, 1B exit out symmetrically with respect to incident light beams;

2) The angles of diffraction ±$\theta$ of the two positive first-order diffracted lights 1A, 1B are not changed along an axis of measurement or in the direction of measurement. That is, when moving the two holograms 32, 33 along the axis of measurement, the angles of diffraction ±$\theta$ of the two positive first-order diffracted light beams 1A, 1B are constant; and 3) A luminous intensity difference between positive and negative same-order diffracted light beams is large. By way of example, the luminous intensity of the positive first-order diffracted light 1A is fully larger than that of a negative first-order diffracted light 1a.

The use of such diffracted light beams produces the following advantages:

1) Even if positions of the light receivers 22, 23 with respect to the two holograms 32, 33 are changed in the direction of a thickness of the substrate 31, beam spot positions on the light receivers 22, 23 have the same amount of deviation, so that two luminous intensity curves obtained by the light receivers 22, 23 have the same amount of variation, having no change in a point of intersection of the two luminous intensity curves;

2) Even if a wavelength of light beams out of the light source 12 is changed, the beam spot positions on the light receivers 22, 23 have the same amount of deviation, so that the two luminous intensity curves obtained by the light receivers 22, 23 have the same amount of variation, having no change in the point of intersection of the two luminous intensity curves; and 3) The light receivers 22, 23 do not receive needless high-order diffracted light beams.

When a diameter D of an illuminated point or zone, i.e., beam spot, on the upper side of each hologram 32, 33 by light beams out of the light source 12 is between 10 and 100 µm, the grating interval or pitch "d" of the holographic diffraction gratings 32, 33 is between 0.1 and 100 µm.

In the embodiments of the present invention, in order to produce diffracted light beams, light beams out of the light source 12 having a wavelength 1 of 780 nm fall incident on the holograms 32, 33 having the grating interval of pitch "d" of 1 µm so as to meet Bragg's equation (sin $\theta$=m$\lambda$/d where m=0, ±1, ±2, . . . ). Thus, high diffraction efficiency over 90% is obtained.

Moreover, even if the diameter D of the beam spot is between 30 and 60 µm, the accuracy in the order of 0.01 µm is possible in connection with detection of the fixed point. This detection accuracy can further be increased by further decreasing the diameter D of the beam spot.

Referring again to FIG. 1, in the first embodiment, the holographic diffraction gratings 32, 33 are transmission and volume-type holograms. Therefore, the positive first-order diffracted light beams 1A, 1B exit out on the side opposite to incident light beams through the transparent substrate 31. The light receivers 22, 23 are disposed on the side opposite to the light source 12 with respect to the holograms 32, 33.

Figure 13A:
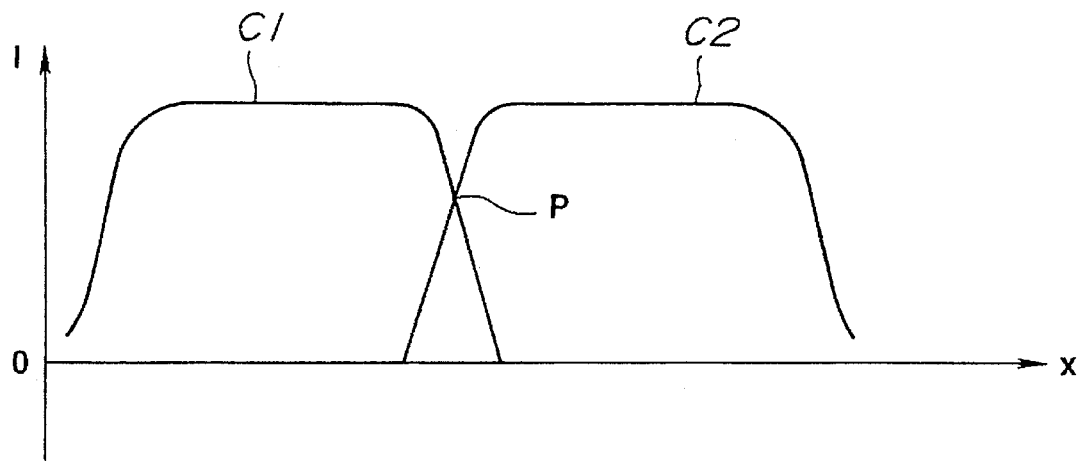
FIGS. 13A and 13B are graphs illustrating luminous intensity curves and a luminous intensity difference curve obtained by the fixed point detecting device according to the present invention.
Figure 13B:
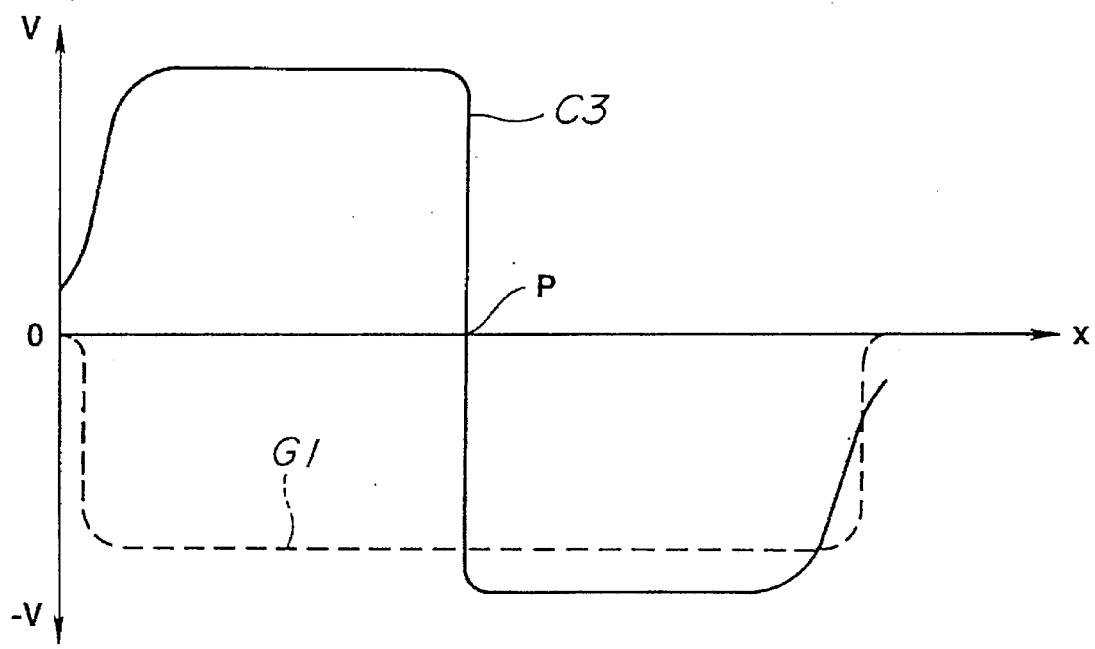

Preferably, light beams out of the light source 12 fall incident on the holograms 32, 33 perpendicularly with respect to the upper sides thereof, i.e., in parallel with respect to the center plane 35. When the movable portion, i.e., the substrate 31, is moved relative to the stationary portion, i.e. the light source 12 and the light receivers 22, 23, and a beam spot produced by light beams out of the light source 12 sweeps on the upper sides of the holograms 32, 33, such beam spot traverses the center plane 35. Thus, referring to FIGS. 13A and 13B, the luminous intensity curves as shown in FIG. 13A and the luminous intensity difference curve as shown in FIG. 13B are obtained. It is noted that FIG. 1 shows a state that light fall incident on just a portion of the center plane 35.

Figure 3:
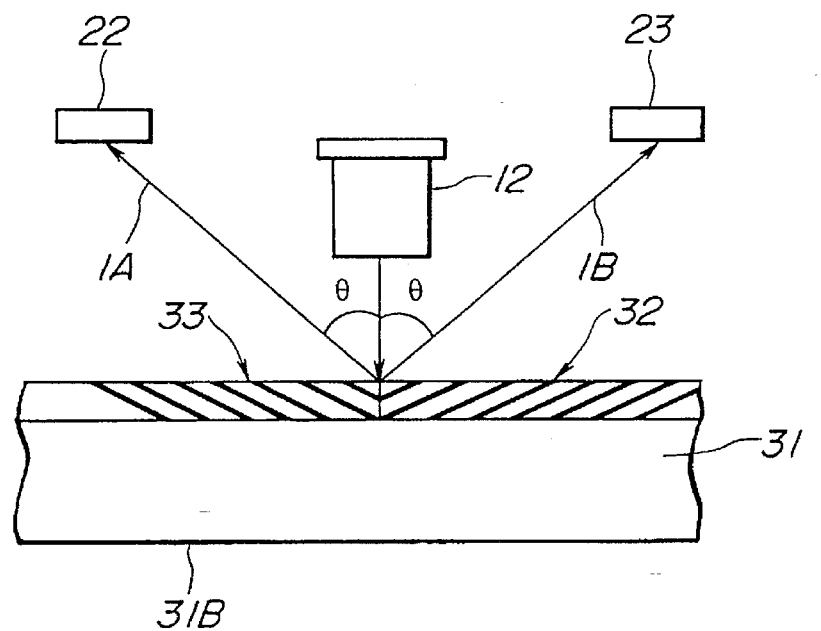
FIG. 3 is a view similar to FIG. 1, showing a second embodiment of the present invention.

FIG. 3 shows a second embodiment of the present invention. The second embodiment is a variant of the first embodiment as shown in FIG. 1. In the second embodiment, the holographic diffraction gratings 32, 33 are reflection and volume-type holograms. Therefore, the positive first-order diffracted light beam 1A, 1B exit out on the same side as incident light beam. The light receivers 22, 23 are disposed on the same side as the light source 12 with respect to the holograms 32, 33.

Figure 4:
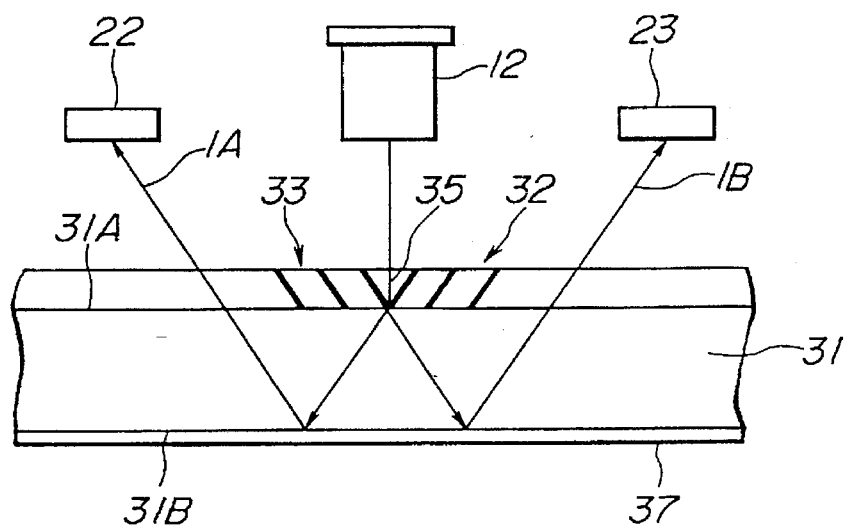
FIG. 4 is a view similar to FIG. 3, showing a third embodiment of the present invention.

FIG. 4 shows a third embodiment of the present invention. The third embodiment is a variant of the first embodiment as shown in FIG. 1. In the third embodiment, the holographic diffraction gratings 32, 33 are transmission and volume-type holograms. Moreover, a reflecting film 37 is arranged on a lower side 31B of the transparent substrate 31. The light receivers 22, 23 are disposed on the same side as the light source 12 with respect to the substrate 31. Light beams out of the light source 12 is diffracted by the holograms 32, 33, and the positive first-order diffracted light beams 1A, 1B which reach the reflecting film 37 through the transparent substrate 31 are reflected by the reflecting film 37, and received by the light receivers 22, 23 after passing through the substrate 31 again.

In the third embodiment, although the transmission-type holograms 32, 33 are used, the light receivers 22, 23 can be disposed on the same side as the light source 12, enabling a reduction in size of the device.

Figure 5:
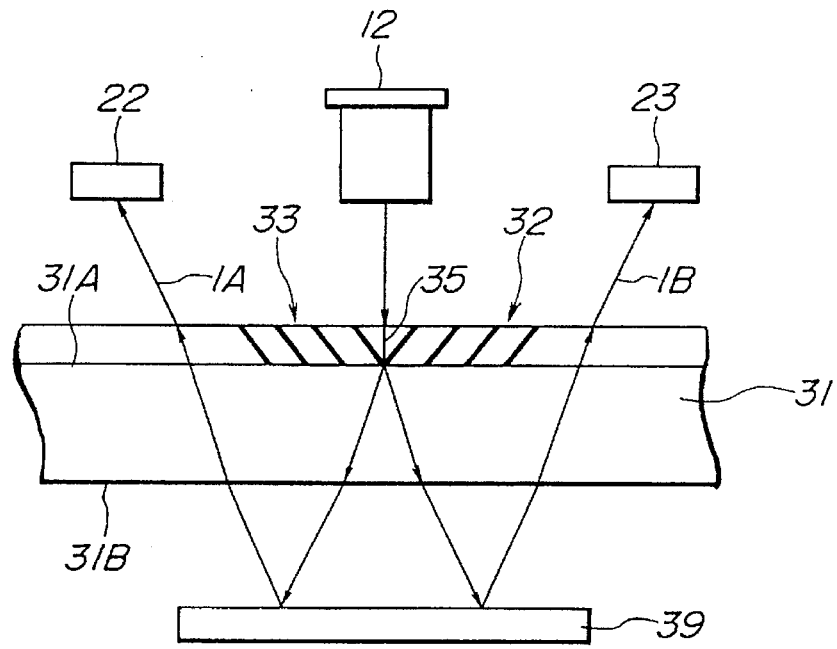
FIG. 5 is a view similar to FIG. 4, showing a fourth embodiment of the present invention.

FIG. 5 shows a fourth embodiment of the present invention. The fourth embodiment is a variant of the third embodiment as shown in FIG. 4. In the fourth embodiment, in place of disposing the reflecting film 37 on the lower side 31B of the transparent substrate 31, a reflecting plate 39 is disposed below the substrate 31. In the same way as in the third embodiment as shown in FIG. 4, the light receivers 22, 23 are disposed on the same side as the light source 12 with respect to the substrate 31. Light beams out of the light source 12 are diffracted by the holograms 32, 33, and the positive first-order diffracted light beams 1A, 1B which reach the reflecting plate 39 through the transparent substrate 31 are reflected by the reflecting plate 39, and received by the light receivers 22, 23 after passing through the substrate 31 again.

Figure 6:
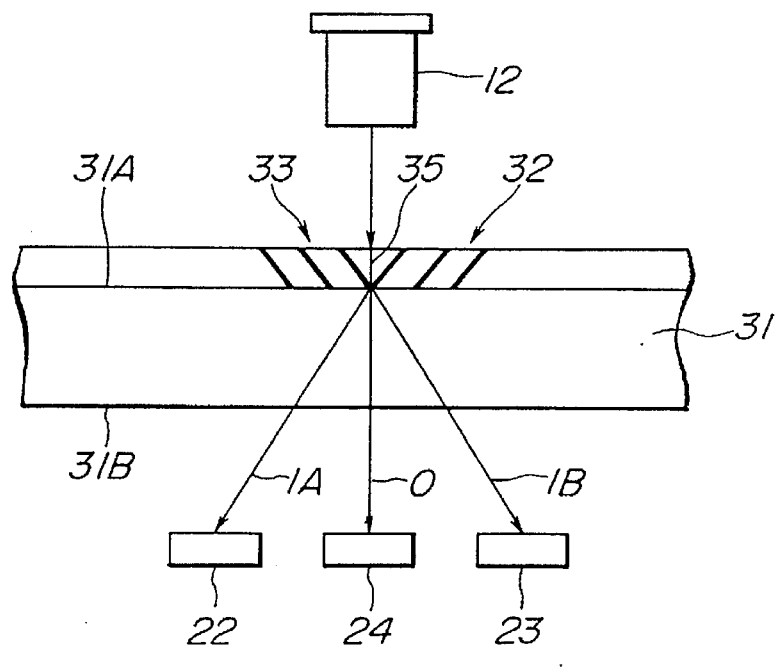
FIG. 6 is a view similar to FIG. 5, showing a fifth embodiment of the present invention.

FIG. 6 shows a fifth embodiment of the present invention. The fifth embodiment is a variant of the first embodiment as shown in FIG. 1. In the fifth embodiment, in addition to the two receivers 22, 23, a third receiver 24 is arranged to detect zero-order diffracted light beam 0. The three light receivers 22, 23, 24 are disposed on the side opposite to the light source 12 with respect to the substrate 31. Light beam out of the light source 12 are diffracted by the holograms 32, 33, and the positive first-order diffracted light beams 1A, 1B are-detected by the two light receivers 22, 23, whereas the zero-order diffracted light beam is 0 is detected by-the third light receiver 24.

In the fifth embodiment, the luminous intensity difference curve is obtained out of the two luminous intensity curves of the positive first-order diffracted light beams 1A, 1B detected by the first and second light receivers 22, 23. Moreover, a gate signal is obtained by the zero-order diffracted light beam 0 detected by the third light receiver 24. The gate signal corresponds to a curve G1 indicated by a dotted line in FIG. 13B.

The gate signal G1 can be used for confirming a presence of the fixed point. By way of example, when a curve C3 indicated by a fully-drawn line in FIG. 13B is obtained, it is necessary to judge whether the curve C3 is obtained by the first and second light receivers 22, 23 or due to the other factor such as noise. If the gate signal G1 is obtained simultaneously with the curve C3, it is confirmed that the curve C3 is a luminous intensity difference curve.

In the embodiments as shown in FIGS. 1 to 6, light beams out of the light source 12 are diffracted only once by the holograms 82, 33 before being detected by the light receivers 22, 23, 24. In the following embodiments as shown in FIGS. 7 to 12, light beams out of the light source 12 are diffracted twice. That is, light beams diffracted by the holograms 22, 23 are reflected by the opposite side of the substrate 31, and diffracted by the holograms 32, 33 again.

Figure 7:
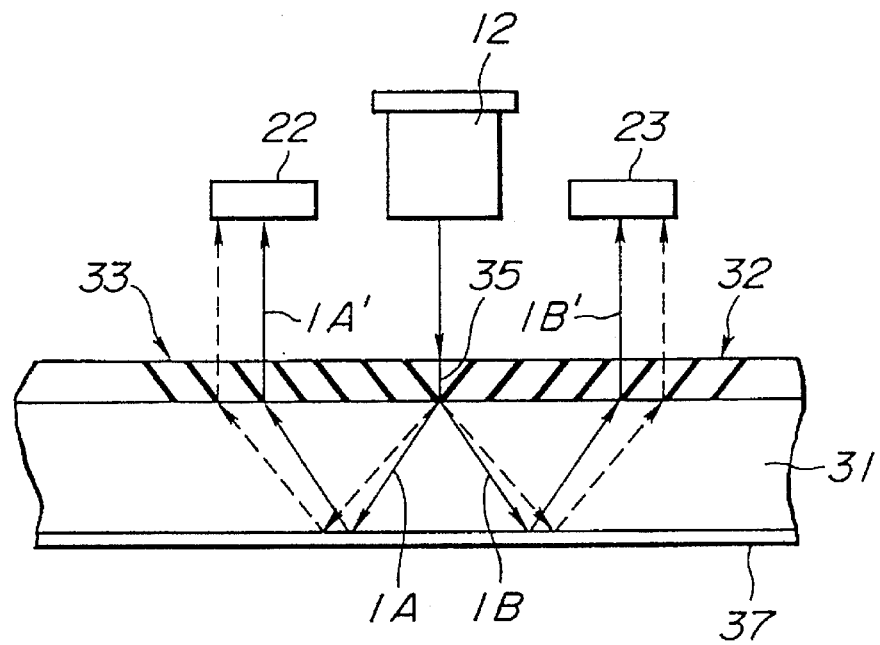
FIG. 7 is a view similar to FIG. 6, showing a sixth embodiment of the present invention.

FIG. 7 shows a sixth embodiment of the present invention. The sixth embodiment is a variant of the third embodiment as shown in FIG. 4. In the sixth embodiment, the holograms 32, 33 are formed in a larger zone than in the third embodiment as shown in FIG. 4. A dimension of the zone having the holograms 32, 33 formed therein should be sufficiently large enough so that diffracted light beams reflected by the reflecting film 37 on the opposite side of the substrate 31 can be diffracted by the holograms 32, 33 again. That is, a dimension of the zone of the holograms 32, 33 should have a sufficient magnitude so that two diffractions are possible when the illuminated point or zone, i.e., beam spot, traverses the center plane 35 so as to obtain the luminous intensity curves in FIG. 13A and the luminous intensity difference curve in FIG. 13B.

As shown in FIG. 7, the second diffraction is carried out by the other hologram than that of the first diffraction. When light beams out of the light source 12 illuminate the vicinity of the center plane 35, the light 1A diffracted by the first hologram 32 is reflected by the reflecting film 37, then diffracted by the second hologram 33. A diffracted light 1A' obtained by the second hologram 33 is detected by the first light receiver 22.

Likewise, the light 1B diffracted by the second hologram 33 is reflected by the reflecting film 37, then diffracted by the first hologram 32. A diffracted light 1B' obtained by the first hologram 32 is detected by the second light receiver 23.

According to the sixth embodiment, three advantages are obtained: As for the first advantage, when light beams out of the light source 12 fall incident on the holograms 32, 33 perpendicularly with respect to the upper sides thereof, i.e., in parallel with respect to the center plane 35, the outgoing lights 1A', 1B' are parallel with respect to incident light beams. That is, if incident light beams are perpendicular to the upper sides of the holograms 32, 33, i.e. in parallel with respect to the center plane 35, the diffracted light beams 1A', 1B' obtained by the second diffraction are perpendicular to the upper sides of the holograms 32, 33, i.e. in parallel with respect to the center plane 35.

As for the second advantage, when light beams out of the light source 12 fall perpendicularly on the upper sides of the holograms 32, 33, outgoing light beams are always parallel to each other as indicated by broken lines in FIG. 7 even if the wavelength of light beams out of the light source 12 is varied. Generally, as expressed by Bragg's equation, if the wavelength $\lambda$ of light is changed, the angle of diffraction $\theta$ is changed. Therefore, if the wavelength $\lambda$ of light is changed, the angle of diffraction $\theta$ due to the first diffraction by the holograms 32, 33 is changed, and the angle of diffraction due to the second diffraction by the holograms 32, 33 is also changed. A change in the angle of diffraction $\theta$ due to the first diffraction is corrected by a change in the angle of diffraction due to the second diffraction.

As for the third advantage, some difference between the diffraction efficiencies of the holograms 32, 33 can be compensated. As described above, the second diffraction is carried out by the other hologram than that of the first diffraction. Suppose, for example, that the diffraction efficiencies of the first and second holograms 32, 33 are $\eta_1$, $\eta_2$, respectively. When the first diffraction is carried out by the first hologram 32, and the second diffraction is carried out by the second hologram 33, the total efficiency is $\eta_1 \times \eta_2$. On the other hand, when the first diffraction is carried out by the second hologram 33, and the second diffraction is carried out by the first hologram 32, the total efficiency is $\eta_2 \times \eta_2$.

Therefore, even if some difference exists between the diffraction efficiencies of the holograms 32, 33, the total efficiency which corresponds to a product of the diffraction efficiencies is the same, i.e., $\eta_1 \times \eta_2 = \eta_2 \times \eta_1$, and luminous energies of diffracted light beams detected by the two light receivers 22, 23 are always the same.

Figure 8:
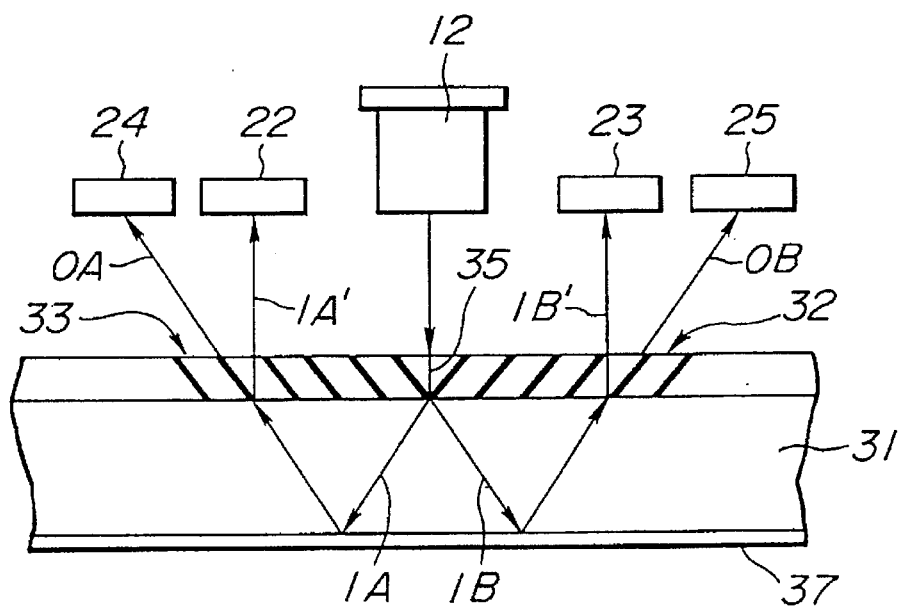
FIG. 8 is a view similar to FIG. 7, showing a seventh embodiment of the present invention.

FIG. 8 shows a seventh embodiment of the present invention. The seventh embodiment is a variant of the sixth embodiment as shown in FIG. 7. In the seventh embodiment, in addition to the two light receivers 22, 23, third and fourth light receivers 24, 25 are arranged to detect the zero-order diffracted light. The light receivers 22, 23, 24, 25 are disposed on the same side as the light source 12 with respect to the substrate 31. Light beams out of the light source 12 are diffracted by the holograms 32, 33, and the positive first-order diffracted lights 1A', 1B' are detected by the first and second light receivers 22, 23, whereas the zero-order diffracted lights 0A, 0B are detected by the third and fourth light receivers 24, 25.

In the seventh embodiment, a first luminous intensity curve is obtained by adding the positive first-order diffracted light 1A' detected by the first light receiver 22 and the zero-order diffracted light 0A detected by the third light receiver 24, whereas a second luminous intensity curve is obtained by adding the positive first-order diffracted light 1B' detected by the second light receiver 23 and the zero-order diffracted light 0B detected by the fourth light receiver 25. One luminous intensity difference curve is obtained by the two luminous intensity curves.

Therefore, even if some difference exists between the diffraction efficiencies of the holograms 32, 33, a stable luminous intensity difference curve is always obtained due to a detection made by adding the zero-order diffracted light and the first-order diffracted light.

Figure 9:
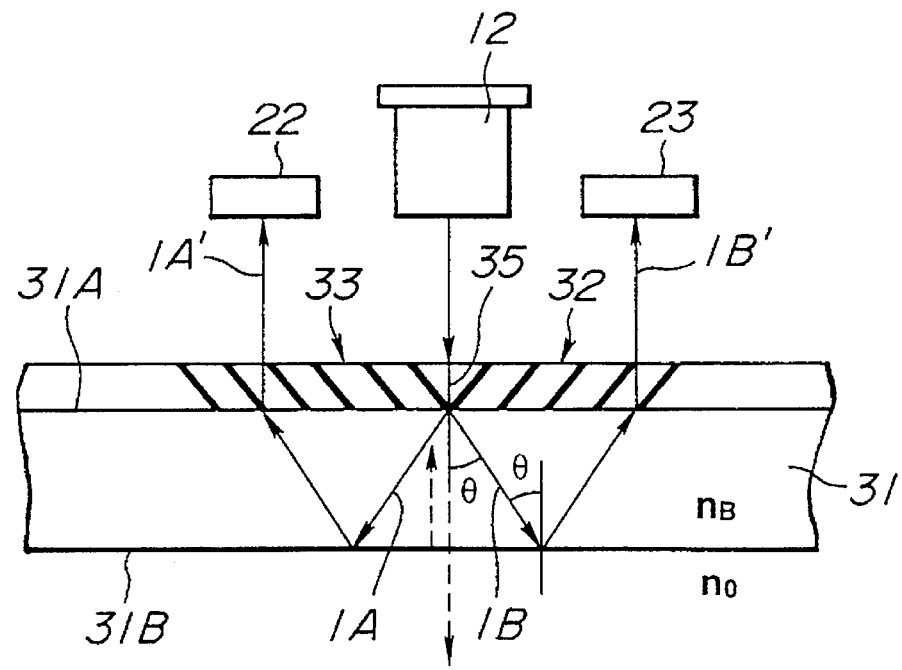
FIG. 9 is a similar to FIG. 8, showings an eighth embodiment of the present invention.

FIG. 9 shows an eighth embodiment of the present invention. The eighth embodiment is a variant of the sixth embodiment as shown in FIG. 7. In the eighth embodiment, the reflecting film is not arranged on the lower side 31B of the substrate 31. Alternatively, an angle of incidence θ of diffracted light beams is appropriately established with respect to the lower side 31 B of the substrate 31 so that diffracted light beams are totally reflected by the lower side 31B of the substrate 31.

Referring to FIG. 9, suppose that a refractive index of the substrate 31 is $n_B$, and a refractive index of air is $n_0$, a critical angle $θ_c$ of lights fell on the lower side 31B of the substrate 31 through the holograms 32, 33 is equal to $n_0/n_B$. Suppose that the substrate 31 is made of glass having a refractive index $n_B$ of 1.5, and a refractive index of air $n_0$ is equal to 1, the critical angle $θ_c$ is equal to 41.8 degrees.

Therefore, when light falls incident on the lower side of the substrate 31 at the angle of incidence greater than the critical angle $θ_c$, diffracted light beams are totally reflected by the lower side 31B of the substrate 31, resulting in no need to arrange the reflecting film on the lower side 31B of the substrate 31. In order to set to a predetermined value the angle of incidence 8 of diffracted light beams with respect to the lower side 31B of the substrate 31, the angle of inclination of the grating vector of each hologram 32, 33 is established to an appropriate value.

In the eighth embodiment, due to no arrangement of the reflecting film, light beams that fall perpendicularly on the lower side 31B of the substrate 31 out of the light source 12 reach is outside through the lower side 31B as indicated by an arrow of a broken line in FIG. 9. Therefore, return light beams reflected by the lower side 31B of the substrate 51 are reduced, enabling a reduction in noise components of light beams out of the light source 12.

Figure 10:
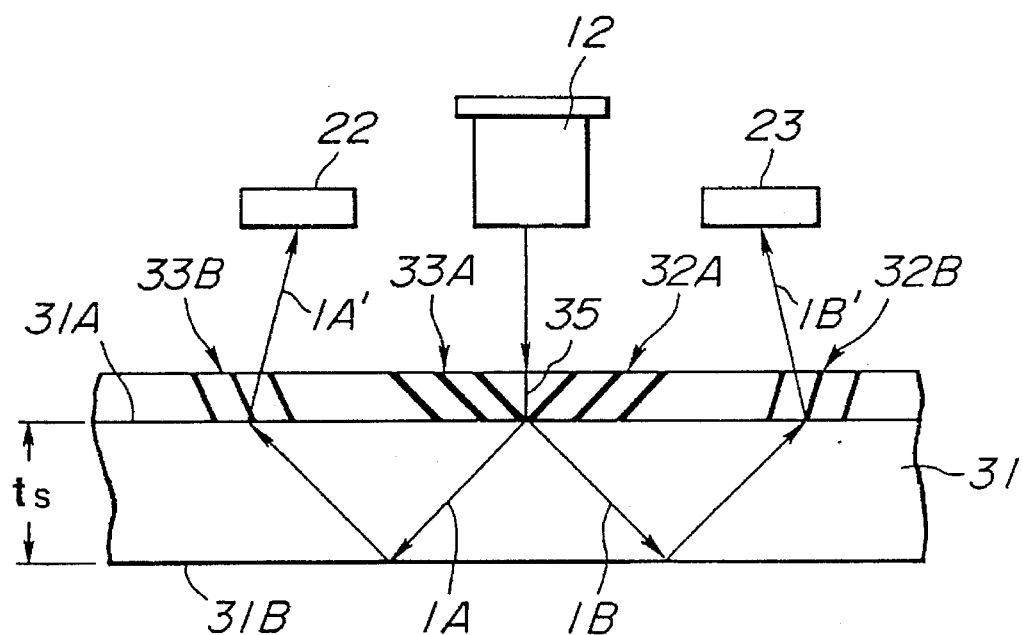
FIG. 10 is a view similar to FIG. 9, showing a ninth embodiment of the present invention.

FIG. 10 shows a ninth embodiment of the present invention. The ninth embodiment is a variant of the eighth embodiment as shown in FIG. 9. In the eighth embodiment, positions of the light receivers 22, 23 with respect to the light source 12 are dependent on the thickness "$t_s$" of the substrate 31. If the thickness "$t_s$" of the substrate 31 is greater, positions of the outgoing lights 1A', 1B' are distant from the light source 12, so that the light receivers 22, 23 should be disposed distant from the light source 12. Contrarily, if the thickness "$t_s$" of the substrate 31 is smaller, the positions of the outgoing lights 1A', 1B' are close to the light source 12, so that the light receivers 22, 23 should be disposed close to the light source 12.

On the other hand, according to the ninth embodiment, each of the two holograms S2, S3 comprises two portions. That is, the first hologram 32 includes an inner portion 32A adjacent to the center plane 35 and an outer portion 32B distant from the center plane 35, the two portions having grating vectors and grating pitches "d" different from each other. Likewise, the second hologram 33 includes an inner portion 33A adjacent to the center plane 35 and an outer portion 33B distant from the center plane 35, the two portion having grating vectors and grating pitches "d" different from each other.

In the ninth embodiment, the outgoing lights 1A', 1B' are inclined with respect to incident light beams so that the light receivers 22, 23 can be disposed distant from or close to the light source 12. FIG. 10 shows a case that the outgoing lights 1A', 1B' are inclined to be close to incident lights so as to dispose the light receivers 22, 23 close to the light source 12.

It is noted that the outer portions 32B, 33B of the holograms 32, 33 may be constructed so that the outgoing lights 1A', 1B' are inclined outward with respect to incident lights. In that case, the light receivers 22, 23 can be disposed more distant from the light source 12.

Figure 11:
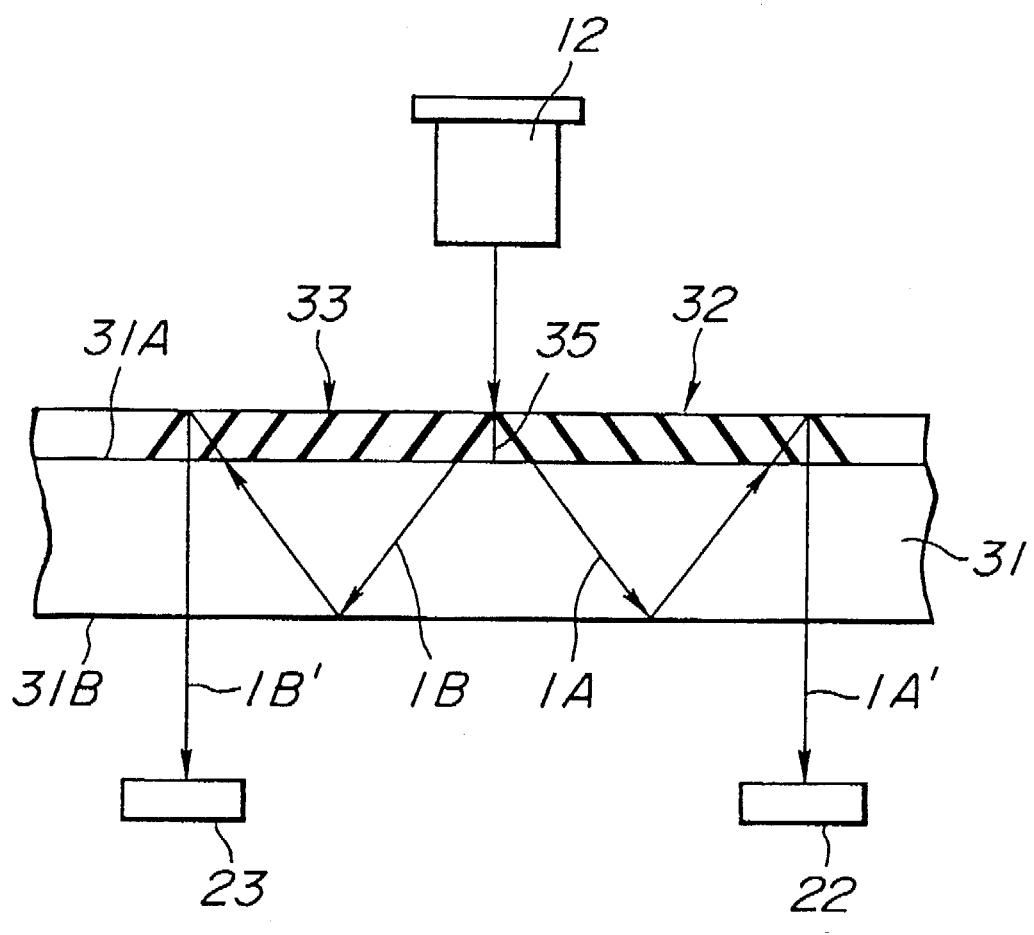
FIG. 11 is a view similar to FIG. 10, showing a tenth embodiment of the present invention.

FIG. 11 shows a tenth embodiment of the present invention. The tenth embodiment is a variant of the eight embodiment as shown in FIG. 9. In the tenth embodiment, the grating vectors of the holograms 32, 33 are inclined in the direction opposite to the inclination of the grating vectors in the eighth embodiment as shown in FIG. 9. Moreover, although the reflecting film is not arranged on the lower side 31B of the substrate 31, diffracted light beams are totally reflected by the lower side 31B of the substrate 31. The two light receivers 22, 23 are disposed on the side opposite to the light source 12.

In the tenth embodiment, the second diffraction is carried out by the same holograms as those of the first diffraction. When light beams out of the light source 12 illuminate the vicinity of the center plane 35, the light 1A diffracted by the first hologram 32 is totally reflected by the lower side 31B of the substrate 31, then diffracted by the first hologram 32. The diffracted light 1A' obtained by the first hologram 32 is detected by the first light receiver 22.

Likewise, the light 1B diffracted by the second hologram 33 is totally reflected by the lower side 31B of the substrate 31, then diffracted by the second hologram 33. The diffracted light 1B' obtained by the second hologram 33 is detected by the second light receiver 23.

According to the tenth embodiment, when light beams out of the light source 12 fall on the holograms 32, 33 perpendicularly with respect to the upper sides thereof, i.e., in parallel with respect to the center plane 35, diffracted light beams received by the light receivers 22, 23 are parallel to incident light beams to the holograms 32, 33.

That is, lights out of the light source 12 are fall incident on the holograms 32, 33 perpendicularly with respect to the upper sides thereof, i.e. in parallel with respect to the center plane 35, and the diffracted light beams 1A', 1B' obtained by the second diffraction exit out from the holograms 32, 33 perpendicularly with respect to the lower sides thereof, i.e., in parallel with respect to the center plane 35.

Figure 12:
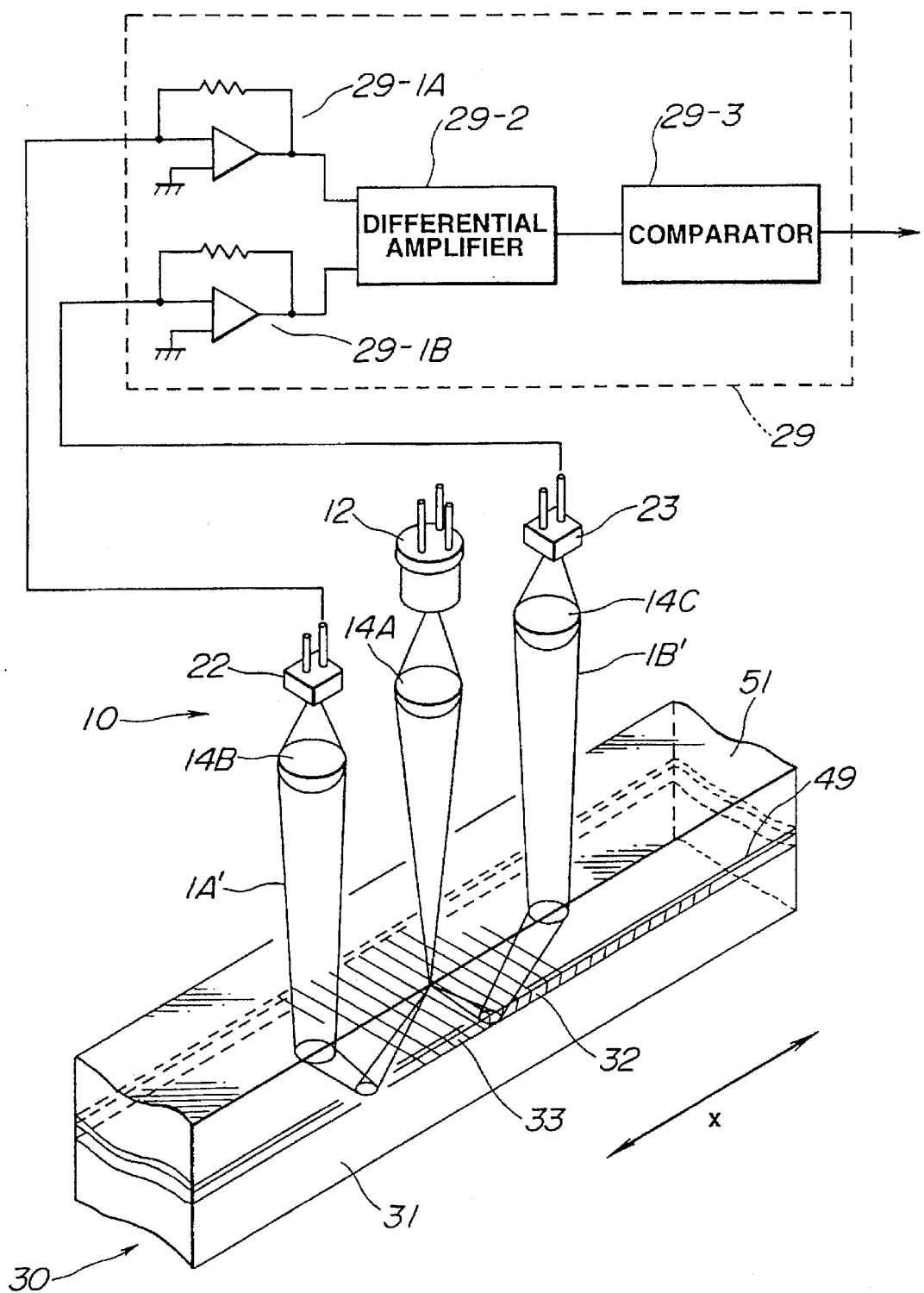
FIG. 12 is a perspective view with an electric processing circuit, showing the eighth embodiment as shown in FIG. 9.

FIG. 12 is a general view of the eighth embodiment as shown in FIG. 9. Referring to FIG. 12, a cover glass 51 is disposed on the upper sides of the holograms 32, 33 through an adhesive agent layer 49. The electric processing circuit 29 may be constructed in a way similar to the known electric processing circuit. It is noted that in FIG. 12, reference numerals 14A to 14C designate a condenser lens.

FIG. 13A shows two luminous intensity curves C1, C2 obtained by the two light receivers 22, 23, and FIG. 13B shows a luminous intensity difference curve C3 obtained by the differential amplifier 29-2.

Referring to FIG. 13A, the two luminous intensity curves C1, C2 are constant after luminous intensity signals increase. This reveals that the diffraction efficiency is improved by the fixed point detecting device of the present invention. According to the present invention, since the intensities of the positive first-order diffracted lights 1A, 1B detected by the light receivers 22, 23 are extremely great, detecting portions of the light receivers 22, 23 are saturated. Flat portions of the two luminous intensity curves C1, C2 indicate such saturation. Therefore, the luminous intensity difference curve C3 is constant before and after the zero cross point P as shown in FIG. 13B.

Figure 14:
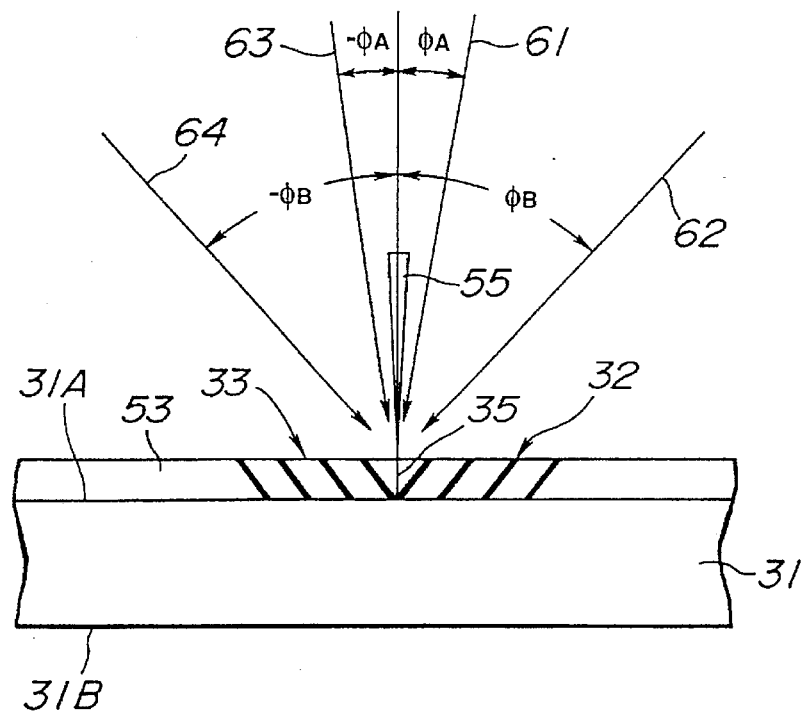
FIG. 14 is a view similar to FIG. 11, showing an example of a method of forming the volume-type holograms.

Referring next to FIG. 14, a description will be S0 made with regard to an example of a method of forming the volume-type holograms 32, 33 on the upper side 31A of the substrate 31. A photosensitizer 53 is placed on the upper side 31A of the substrate 31, and a mask 55 is perpendicularly disposed thereabove. From both sides of the mask 55, plane waves 61, 62, 63, 64 fall incident simultaneously on the upper side 31A of the substrate 31 at angles of incidence $\pm\Phi_A$, $\pm\Phi_B$. exposing the photosensitizer 58.

The plane waves 61, 62 having the angles of incidence $+\phi_A$, $+\phi_B$ serve to form the first hologram 32 on the right side of the center plane 95, whereas the plane waves 63, 64 having the angles of incidence $-\phi_A$, $-\phi_B$ serve to form the second hologram 33 on the left side of the center plane 35. In such a way, by this method, the two symmetrical holograms 32, 39 are simultaneously formed on both sides of the center plane 35.

The mask 55 has a slender wedge-shaped section, and a sharp-pointed end portion. The mask 5 is disposed so that the end portion is in contact with the upper side 31A of the substrate 31. It is preferable to avoid as much as possible a production of a shadow of the mask 55 on the center plane so as was to prevent a needless image of grating from being produced due to diffraction by the end portion of the mask 55.

Figure 15:
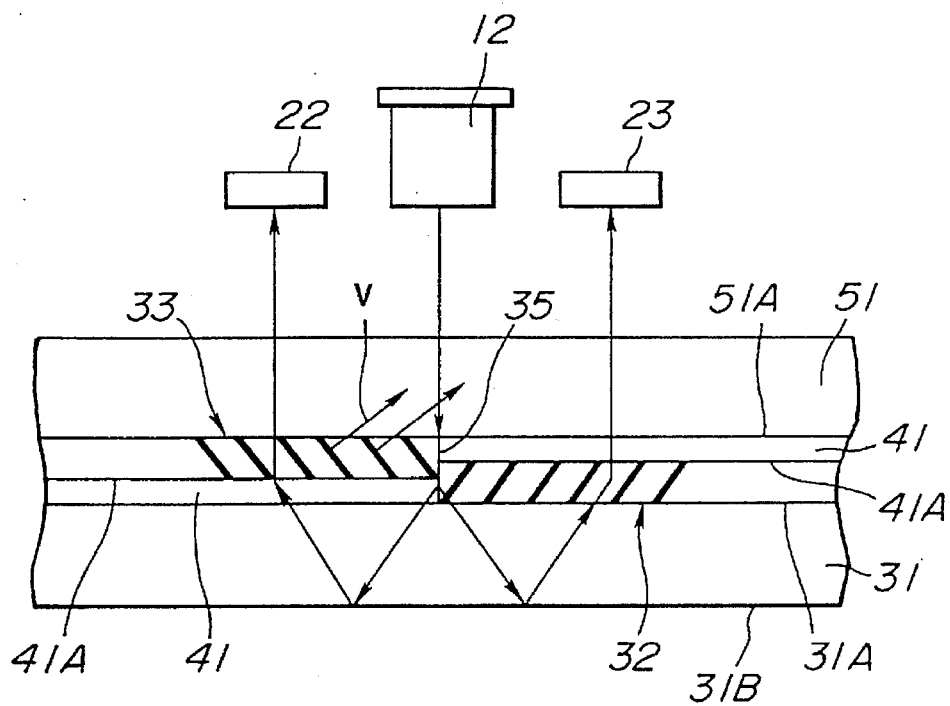
FIG. 15 is a view similar to FIG. 14, showing another example of a method of forming the volume-type holograms.

FIG. 15 shows another example of a method of forming the holograms 32, 33. The volume-type hologram 32 is formed on an upper side 31A of a first substrate 31, whereas the volume-type hologram 33 is formed on an upper side 51A of a second substrate 51. Such holograms 32, 33 are formed by the known method, each having a grating vector V inclined at a predetermined angle of inclination.

Next, as shown in FIG. 15, one of the holograms 32, 33 is turned over, and put on the other. An adhesive agent 41 is placed therebetween. At that time, the first hologram 32 on the right side and the second hologram 33 on the left side are disposed to have the grating vectors V symmetrically inclined with respect to the center plane 35.

The first hologram 32 and the second hologram 33 are dislocated with each other in the vertical direction by the thickness of the adhesive agent 41. Therefore, if the thickness of the adhesive agent 41 is fully decreased, the same structure as that of the eighth embodiment in FIG. 9 is obtained. It is noted that the two transparent substrates 31, 51 serve as a cover glass, respectively.

Figure 16:
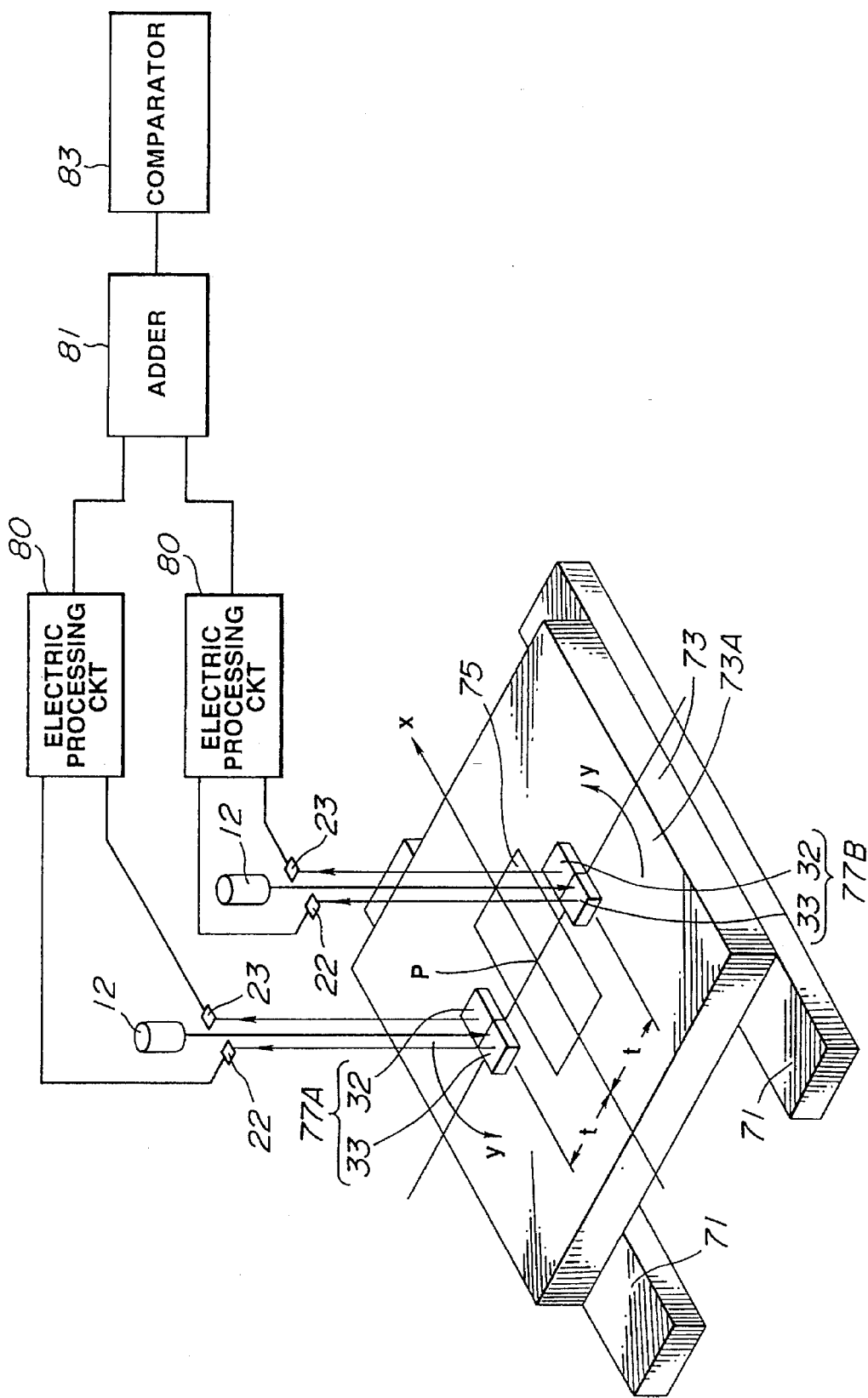
FIG. 16 is a view similar to FIG. 12, showing an eleventh embodiment of the present invention.

FIG. 16 is a general view of an eleventh embodiment of the present invention. In the eleventh embodiment, the fixed point detecting device is constructed to include two fixed point detecting portions. The fixed point detecting device of the type may be used, for example, in an X-ray exposure drawing device. The X-ray exposure drawing device includes two rails 71, 71 and a stage 73 which is movable thereon in the direction of measurement or X-direction.

An object to be detected 75, for example, a photosensitizer, is placed on an upper side 73A of the stage 73, and the object 75 has a fixed point P to be detected. By way of example, in case of carrying out double exposure on the photosensitizer, the fixed point P should accurately be detected by the fixed point detecting device. Conventionally, such detection of the fixed point P is carried out by a single fixed point detecting device. Therefore, when the stage 73 is yawed as indicated by arrows "y" in FIG. 16 with respect to the direction of measurement or X-direction, the fixed point cannot be detected accurately.

On the other hand, according to the eleventh embodiment, since the fixed point P is detected by the two fixed point detecting portions, an error due to such yawing can be eliminated.

In the eleventh embodiment, holograms 77A, 77B are placed on the upper side 73A of the stage 73 and on both sides of the object 75. Each hologram 77A, 77B includes two holograms 32, 33 as described above. The two holograms 32, 33 are disposed in the direction of measurement or X-direction, and constructed to be symmetrical with respect to the center plane.

Two fixed point detecting portions are disposed corresponding to the holograms 77A, 77B, each portion having an optical system and a detecting system. The optical system includes the light source 12, and the detecting system includes a pair of light receivers 22, 23 and the electric processing circuit 80.

Figure 17:
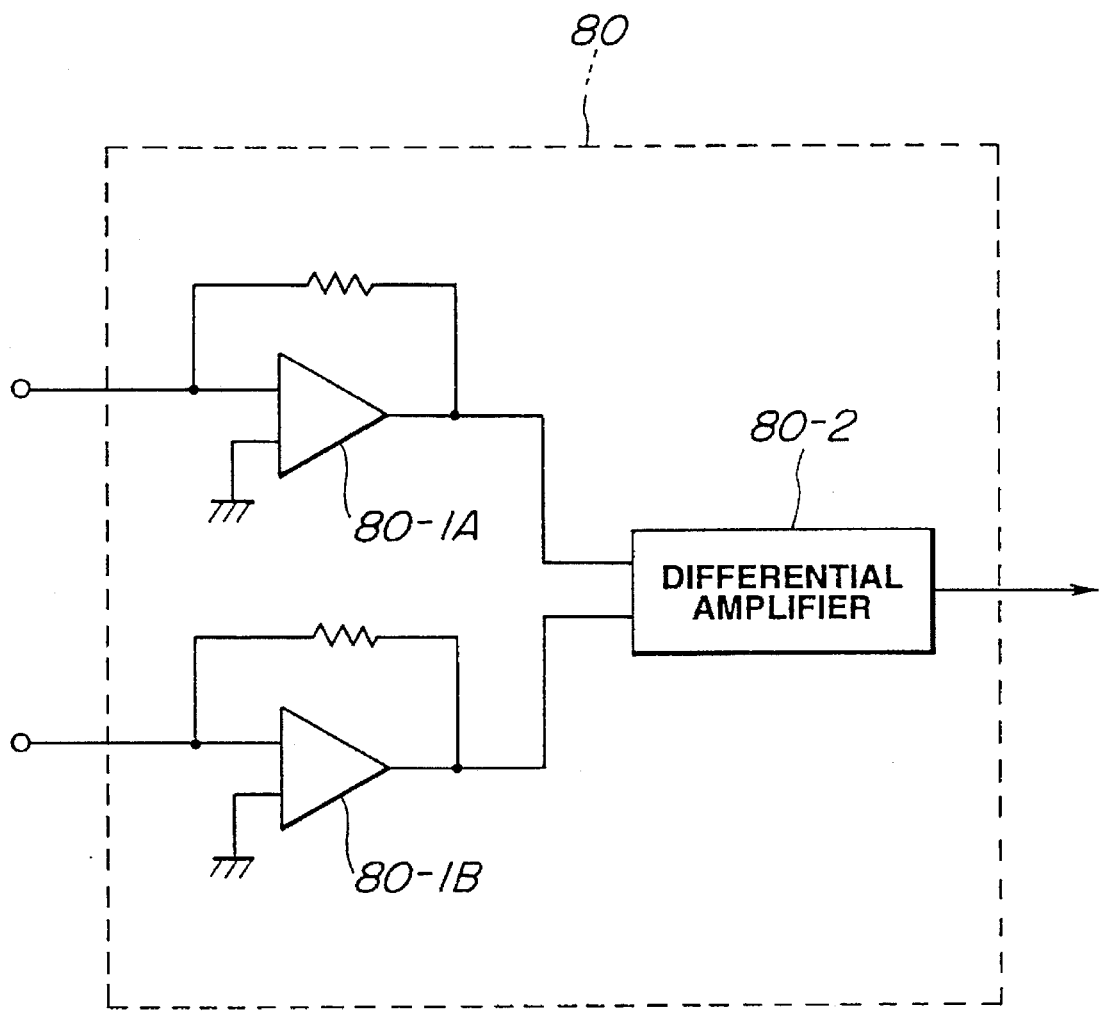
FIG. 17 is a block diagram illustrating the electric processing circuit in the eleventh embodiment as shown in FIG. 16.

FIG. 17 shows an example of the electric processing circuit 80. The electric processing circuit 80 has a pair of current-voltage converter 801-A, 80-1B and a differential amplifier 80-2.

In the eleventh embodiment, as shown in FIG. 16, the fixed point detecting device includes an adder 81 for adding output signals of the differential amplifiers 80-2, and a comparator 83 which inputs output of the adder 81.

Figure 18A:
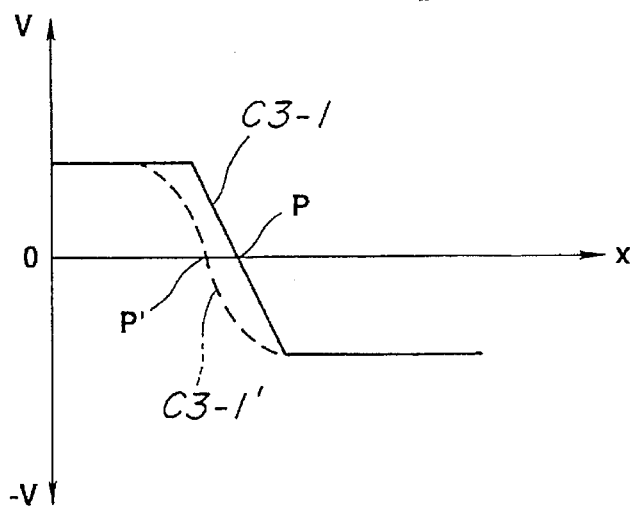
FIGS. 18A to 18C are views similar to FIGS. 13A and 13B, illustrating output signals of two differential amplifiers and an adder of the fixed point detecting device according to the present invention.
Figure 18B:
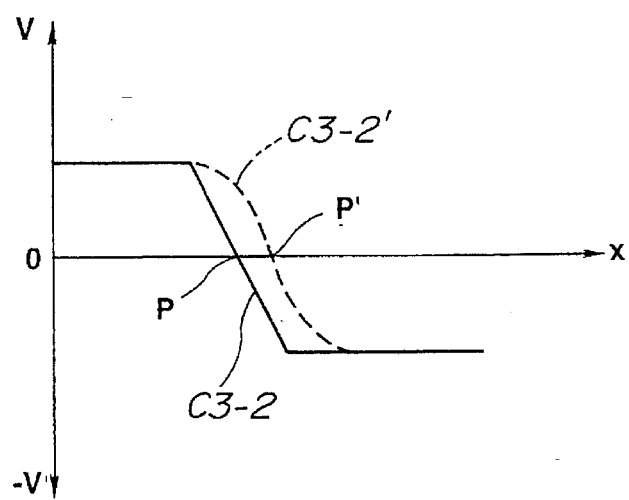
Figure 18C:
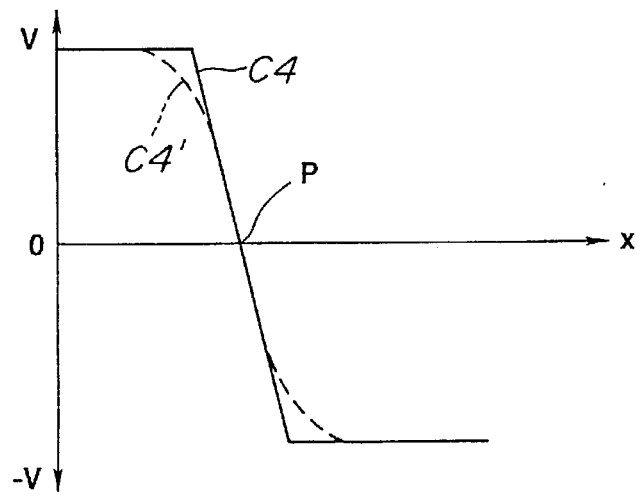

FIGS. 18A to 18C show output signals of the two differential amplifiers 80-2 and the adder 81. A curve C3-1 of a fully-drawn line in FIG. 18A indicates an output signal of the first differential amplifier 80-2, and a curve C3-2 of a fully-drawn line in FIG. 18B indicates an output signal of the second differential amplifier 80-2, and a curve C4 of a fully-drawn line in FIG. 18C indicates an output signal of the adder 81.

Figure 19:
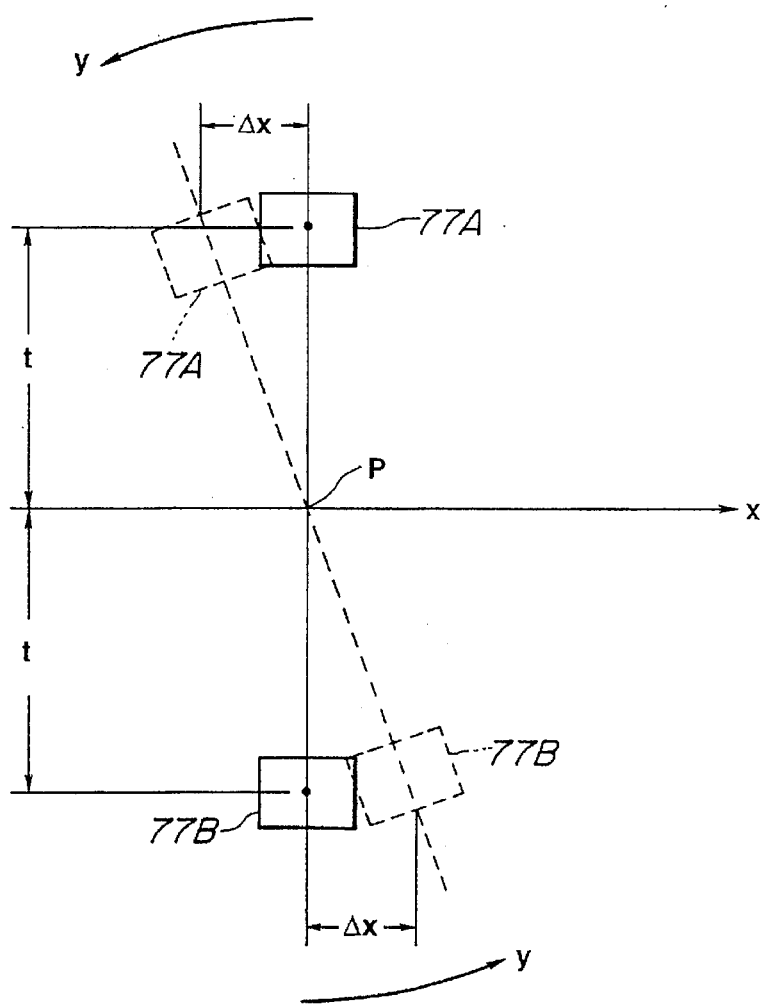
FIG. 19 is a view explaining a function of the eleventh embodiment as shown in FIG. 16.

Referring next to FIG. 19, a description will be made with regard to an error due to yawing and a function of compensating for this error. As shown in FIG. 19, the X-axis is taken via the fixed point P of the object to be detected 75 and in the direction of measurement. Suppose that the holograms 77A, 77B placed on the upper side 73A of the stage 73 of the X-ray exposure drawing device are symmetrically disposed with respect to the X-axis, and that a distance from the X-axis to each hologram 77A, 77B is "t". The fixed point detecting devices are disposed corresponding to the holograms 77A, 77B on both sides of the object 75.

When the stage 73 of the X-ray exposure drawing device is yawed, the holograms 77A, 77B placed on the upper side 73A of the stage 73 are also yawed as indicated by arrows "y" in FIG. 19. Thus, the holograms 77A, 77B produce rotary motion around the fixed point P. Specifically, the two holograms 77A, 77B are moved by the same distance in the opposite direction. The first hologram 77A is moved by $\Delta X$ in the negative direction of the X-axis, whereas the second hologram 77B is moved by $\Delta X$ in the positive direction of the X-axis.

Referring again to FIGS. 18A to 18C, curves of a broken line indicate output signals of the two differential amplifiers 80-2 and the adder 81 when the stage 73 is yawed. The curve C3-1' of a broken line in FIG. 18A indicates an output signal of the first differential amplifier 80-2, and the curve C3-2' of a broken line in FIG. 18B indicates an output signal of the second differential amplifier 80-2, and the curve C4' of a broken line in FIG. 18C indicates an output signal of the adder 81.

The output signal of the adder 81 is provided to the camparator 83, obtaining the zero cross point. As indicated by the curve C4' of a broken line in FIG. 18C, the output signal of the adder 81 is varied with yawing, while the zero cross point is not changed. In the eleventh embodiment, the output signals of the two differential amplifiers 80-2 are varied with yawing, which are added, however, by the adder-81, having a variation part canceled.

Figure 20:
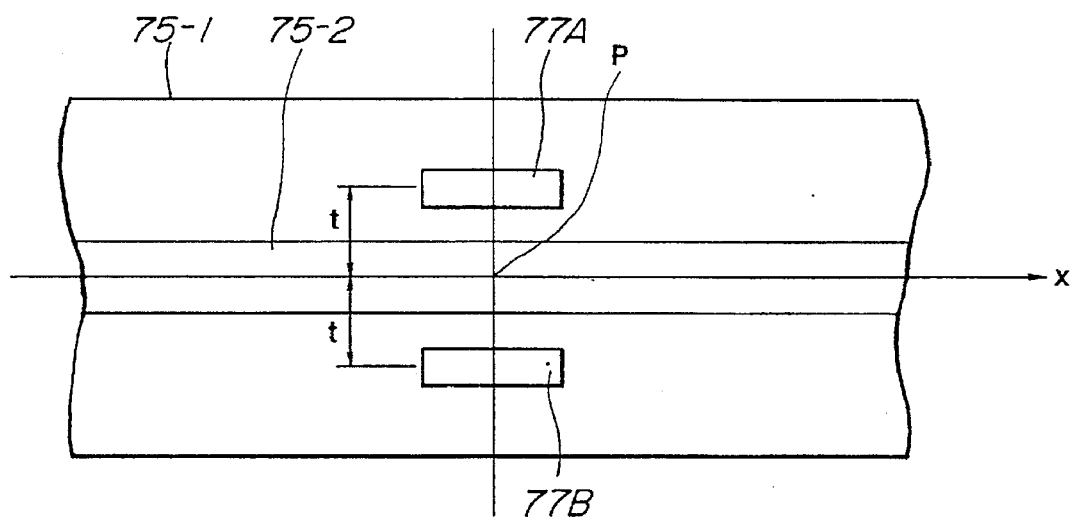
FIG. 20 is a view similar to FIG. 19, explaining a case wherein the fixed point detecting device according to the present invention is used in a linear encoder.

FIG. 20 shows an example wherein the fixed point detecting device of the present invention is used in a linear encoder. The linear encoder has a scale substrate 75-1 having an upper side on which a diffraction grating 75-2 for detecting a displacement is disposed along the axis of measurement or X-axis. A displacement in the axis of measurement (X-axis) is detected by the diffraction grating 75-2. The holograms 77A, 77B are symmetrically placed on both sides of the diffraction grating 75-2 for detecting a displacement.

In this example, the fixed point detecting device includes two fixed point detecting portions corresponding to the two holograms 77A, 77B, each portion having an optical system and a detecting system. It is noted that such optical system and detecting system of the fixed point detecting portion may be the same as those in the eleventh embodiment of the present invention as shown in FIG. 16. In such a way, in this example also, an error due to yawing of the scale substrate 75-1 can be eliminated in the same way as in the eleventh embodiment.

Having described in detail the preferred embodiments of the present invention, it is noted that the preset invention is not limited thereto, and various changes and modifications are possible without departing the spirit of the present invention.

What is claimed is:

1. A system for detecting a fixed point, the system having an axis of measurement, comprising:
    a light source;
    a hologram disposed apart from said light source for diffracting light beams out of said light source, said hologram having two portions adjacent to each other and separated by an imaginary center plane perpendicular thereto, said hologram being disposed on a transparent substrate, each of said two portions including:
        an inner portion adjacent to said imaginary center plane; and
        an outer portion apart from said imaginary center plane,
        said inner portion and said outer portion having grating vectors inclined at angles of inclination different from each other with respect to said imaginary center plane,
        wherein said light beams out of said light source are subjected to a first diffraction by said inner portion of each of said two portions and a second diffraction by said outer portion of each of said two portions;
    at least two light receivers arranged to detect light beams diffracted by said two portions of said hologram, said light beams including positive and negative homogeneous components; and
    a reflecting surface arranged on a side of said transparent substrate opposite to said light source with respect to said hologram, said reflecting surface reflecting said light beams diffracted by said two portions of said hologram, said light beams reflected by said reflecting surface being diffracted by said two portions of said hologram again to obtain outgoing light beams parallel to said light beams out of said light source,
    wherein the fixed point is obtained by determining a point at which said light beams detected by said two light receivers have a same magnitude when moving said hologram relative to said light source and said two light receivers along the axis of measurement,
    wherein an angle of diffraction of said light beams diffracted by one of said two portions and an angle of diffraction of said light beams diffracted by another of said two portions have opposite signs and a same absolute value and are constant along the axis of measurement, and
    wherein a difference in luminous intensity exists between said positive and negative homogeneous components of said light beams.

2. A system as claimed in claim 1, wherein said two portions of said hologram are symmetrically arranged on both sides of said imaginary center plane, and have grating vectors symmetrically inclined with respect to said imaginary center plane and the same grating interval.

3. A system as claimed in claim 2, wherein said hologram includes a transmission hologram.

4. A system as claimed in claim 2, wherein said hologram includes a reflection hologram.

5. A system as claimed in claim 3, wherein said two light receivers are disposed on the side opposite to said light source with respect to said hologram.

6. A system as claimed in claim 1, wherein said two light receivers are disposed on the same side as said light source with respect to said hologram.

7. A system as claimed in claim 1, wherein said reflecting surface includes a film placed on said transparent substrate.

8. A system as claimed in claim 1, wherein said reflecting surface includes a plate disposed apart from said transparent substrate, said transparent substrate being located between said light source and said plate.

9. A system as claimed in claim 1, wherein said reflecting surface includes a side of said transparent substrate disposed furthest away from said light source.

10. A system as claimed in claim 9, wherein said light beams diffracted by said two portions of said hologram are fall incident on said side of said transparent substrate at an angle greater than a critical angle.

11. A system for detecting a fixed point, the system having an axis of measurement, comprising:
    means for providing light beams;
    means for diffracting light beams provided by said providing means, said providing means having two portions adjacent to each other and separated by an imaginary center plane perpendicular thereto, said diffracting means being disposed on a transparent substrate, each of said two portions including:

an inner portion adjacent to said imaginary center plane; and an outer portion apart from said imaginary center plane, said inner portion and said outer portion having grating vectors inclined at angles of inclination different from each other with respect to said imaginary center plane, wherein said light beams out of said providing means are subjected to a first diffraction by said inner portion of each of said two portions and a second diffraction by said outer portion of each of said two portions;

means for detecting said light beams diffracted by said two portions of said diffracting means, said detecting means having at least two portions, said light beams including positive and negative homogeneous components; and means for reflecting said light beams diffracted by said two portions, said light beams reflected by said reflecting means being diffracted by said two portions again to obtain outgoing light beams parallel to said light beams out of said providing means, wherein the fixed portion is obtained by determining a point at which said light beams detected by said two portions of said detecting means have a same magnitude when moving said diffracting means relative to said providing means and said detecting means along the axis of measurement, wherein an angle of diffraction of said light beams diffracted by one of said two portions of said diffracting means and an angle of diffraction of light diffracted by another of said two portions of said diffracting means have opposite signs and a same absolute value and are constant along the axis of measurement, and wherein a difference in luminous intensity exists between said positive and negative homogeneous components of said light beam.

12. A system as claimed in claim 11, wherein said diffracting means includes a holographic diffraction grating.

13. A system for detecting a fixed point, the system having an axis of measurement, comprising:

two plates symmetrically disposed on both sides of the fixed point, each plate including a pair of holograms disposed on a transparent substrate and adjacent to each other;

two detectors arranged corresponding to said two plates, each detector including a light source and a pair of light receivers arranged to detect light beams diffracted by said pair of holograms, the fixed point being determined by said light beams detected by said pairs of light receivers of said two detectors when moving said two plates relative to said two detectors along the axis of measurement; and electric circuit means connected to said two detectors for obtaining a difference in luminous intensity between light beams out of said two plates.

14. A system as claimed in claim 13, wherein said electric circuit means include a pair of current-voltage converters, a differential amplifier connected in series to said pair of current-voltage converters, and a comparator connected in series to said differential amplifier.

* * * * *